United States Patent [19]

Greene et al.

[11] Patent Number: 5,449,204

[45] Date of Patent: Sep. 12, 1995

[54] DOUBLE CONTAINMENT FITTING

[76] Inventors: Karen C. Greene, 2795 E. 91st St., Tulsa, Okla. 74137; James A. Cheek, 7409 South 1st St., Broken Arrow, Okla. 74011

[21] Appl. No.: 338,347

[22] Filed: Nov. 14, 1994

Related U.S. Application Data

[63] Continuation-in-part of Ser. No. 139,829, Oct. 22, 1993, Pat. No. 5,368,338, and a continuation-in-part of Ser. No. 272,037, Jul. 18, 1994, Pat. No. 5,419,593.

[51] Int. Cl.$^6$ .............................................. F16L 47/02
[52] U.S. Cl. .................................. 285/133.1; 285/915; 285/179; 138/113
[58] Field of Search ................... 285/133.1, 138, 134, 285/136, 915, 179; 138/111, 112, 113, 114

[56] References Cited

U.S. PATENT DOCUMENTS

| | | | |
|---|---|---|---|
| 2,475,635 | 7/1949 | Parsons | 285/133.1 X |
| 2,696,835 | 12/1954 | Kaiser | 285/138 X |
| 2,896,669 | 7/1959 | Broadway et al. | 285/133.1 X |
| 3,546,356 | 12/1970 | Graybill | 285/179 X |
| 4,149,739 | 4/1979 | Morris | 285/133.1 |
| 4,522,234 | 6/1985 | Kellner et al. | 138/113 X |
| 4,754,782 | 7/1988 | Grantham | 138/113 X |
| 4,779,652 | 10/1988 | Sweeney | |
| 4,786,088 | 11/1988 | Ziu | |
| 4,886,305 | 12/1989 | Martin | |
| 4,930,544 | 6/1990 | Ziu | |

*Primary Examiner*—Randolph A. Reese
*Assistant Examiner*—Heather Chun Shackelford
*Attorney, Agent, or Firm*—Head & Johnson

[57] ABSTRACT

A double containment fitting for use with a double containment pipe having an inner carrier pipe and an outer containment pipe. The fitting includes an inner containment member having a pair of open ends and a pair of centering spiders, each spider adhesively engaged with the exterior of the inner containment member near an end of the inner containment member. An outer containment member has a pair of open ends, each open end including a first portion having an inner radius larger than the exterior radius of the centering spider and a second portion adjacent the first portion having an inner radius less than the exterior radius of the centering spider, providing a shoulder for abutting an edge of the centering spider.

7 Claims, 3 Drawing Sheets

DOUBLE CONTAINMENT FITTING

This application is a continuation-in-part of U.S. Ser. No. 08/138,829 filed Oct. 22, 1993 now U.S. Pat. No. 5,368,338 and a continuation-in-part of U.S. Ser. No. 08/272,037 filed Jul. 8, 1994 now Patent Number 5,419,593.

BACKGROUND OF THE INVENTION

1. Field of the Invention

The present invention relates to double containment pipe systems having an inner carrier pipe for passage and transportation of fluid within an outer containment pipe. In particular, the present invention relates to double containment fittings for double containment pipe systems.

2. Prior Art

Double containment pipe systems are utilized for transporting fluids comprising an inner, or carrier, pipe, positioned concentrically within an outer, or containment, pipe. Both a carrier pipe and its related containment pipe are constructed by a series of pipe sections joined by pipe joints.

Traditionally, a carrier pipe system is intended to, and is constructed to, provide a means for transporting a fluid over a long distance efficiently and without allowing any of the fluid to escape from the carrier pipe system. The most common causes of escape of a fluid from a carrier pipe system are either a break in a pipe section, a break in a pipe joint, or a loosening of a pipe joint.

A carrier pipe system is constructed to be a safe and reliable means for transporting fluids, especially fluids which might be dangerous or which might contaminate the surrounding area should any escape from the carrier pipe system. Occasionally, a carrier pipe does fail and contaminating fluid covers the surrounding area.

Government regulations now require secondary containment systems on many fluid installations and will require secondary containment on many others in the near future. The carrier pipe is normally independent from the double containment pipe which encloses it, and the double containment pipe is not in communication with the carrier pipe unless and until the carrier pipe should develop a leak. Then, the outer containment pipe serves its basic purpose by collecting fluid escaping from the carrier pipe and prevents contact with the environment until the leak is discovered and repaired.

Pipe systems have been traditionally constructed of steel or other forms of metal. With the development of fiber glass reinforced resins, simple carrier pipe systems started to be constructed of fiber glass reinforced resins where such usage was permissible.

Double containment piping systems are, however, relatively new to the fiber glass resin pipe industry, and a great deal of the design requirements and capabilities of the fiber glass resin double containment systems are being developed even as the systems are being installed.

While double containment systems are fabricated from concentric lengths of double containment pipe, a double containment system is also required at fittings such as elbows and connections.

It is a principal object and purpose of the present invention to provide a fitting for a double containment piping system.

It is a further object and purpose of the present invention to provide a fitting for a double containment piping system that is easily assembled in the field from standardized components.

It is a further object and purpose of the present invention to provide a fitting wherein the inner containment member need not be bonded to the outer containment member.

SUMMARY OF THE INVENTION

The present invention provides a fitting for use with a double containment pipe system having a series of inner carrier pipes and a series of outer containment pipes coaxially with the inner containment pipes.

A double containment fitting includes an inner containment member having a pair of opposed ends. Each open end has an inner radius slightly larger than the exterior radius of the carrier pipe section so that the carrier pipe sections are received in the open ends.

A pair of centering spiders are concentric with the inner containment member and are adhesively engaged with the exterior of the inner containment member near the open end of the inner containment member.

An outer containment member is concentric and coaxial with the inner containment member. The outer containment member includes a pair of open ends including a first portion having inner radius larger than the exterior radius of the centering spider. A second portion, adjacent the first portion, has an inner radius less than the exterior radius of the centering spider. Accordingly, the centering spider is received within each open end with the combination of the first portion and the second portion forming and providing a shoulder for abutting an edge of the centering spider.

Neither the inner containment member nor the centering spiders are bonded or adhesively fastened to the outer containment member. The containment pipe sections will also be received in the open ends. The containment pipe sections will be bonded to the inside of each open end of the outer containment member.

Accordingly, each centering spider and attached carrier member will be properly aligned by the end of the containment pipe section at each open end.

DETAILED DESCRIPTION OF THE PREFERRED EMBODIMENTS

Figure 1:
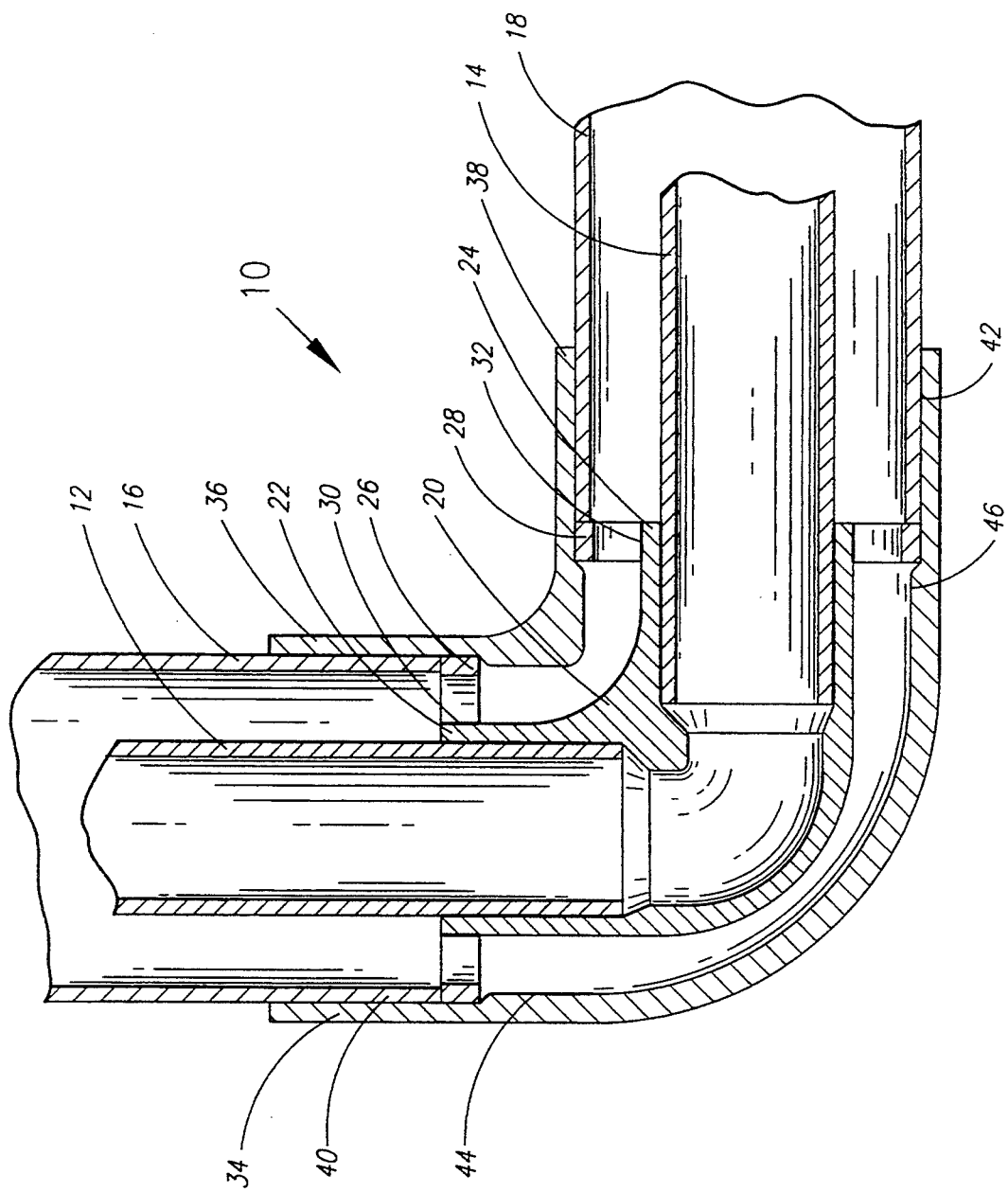
FIG. 1 illustrates a sectional view of a double containment pipe fitting constructed in accordance with the present invention.

Referring to the drawings in detail, FIG. 1 illustrates a sectional view of a double containment fitting 10 for use with a double containment pipe system. The double containment pipe system includes a series of inner carrier pipes, such as inner carrier pipes 12 and 14. Outer containment pipes 16 and 18 are concentric and coaxial with the inner containment pipes. The inner carrier pipes and surrounding outer containment pipes must be constrained against thermal expansion and contraction other than at the present fitting.

The double containment fitting 10 includes an inner containment member 20 having a pair of opposed open ends. The inner containment member 20 has open ends at 90° angles, although other angles are possible within the confines of the present invention. Each open end 22 and 24 has an inner radius slightly larger than the exterior radius of the carrier pipe. Accordingly, the end of the carrier pipe sections 12 and 14 are received in the open ends 22 and 24. The inner carrier pipes 12 and 14 may be adhesively bonded to the open ends 22 and 24 and form a liquid-tight seal.

A pair of centering spiders 26 and 28 are in the nature of rings. When installed, the centering spiders are concentric with the inner containment member. The spiders are not designed to restrain or handle thermal expansion or contraction loads.

Each spider has an inner area adhesively engaged with the exterior of the inner containment member near the open end of the inner containment member. Centering spider 26 is adhesively engaged at 30 with the open end 22 of the inner containment member. Centering spider 28 is adhesively engaged at 32 to the open end 24 of the inner containment member 20. Each spider may also have openings therethrough to allow passage of fluid and placement of detection cables and equipment.

An outer containment member 34 is concentric and coaxial with the inner containment member. The outer containment member 34 includes a pair of open ends 36 and 38. Neither the inner containment member nor the centering spiders 26 or 28 are bonded or adhesively fastened to the outer containment member.

Each open end 36 and 38 of the outer containment member includes a first portion 40 and 42 having an inner radius larger than the exterior radius of the centering spider.

A second portion 44 and 46 of each open end, adjacent the first portion, has an inner radius less than the exterior radius of the centering spider. Accordingly, the centering spider is received within each open end with the combination of the first portion and second portion forming and providing a shoulder for abutting an edge of a centering spider. The centering spider will, thus, be received in the open end up to the shoulder.

In the embodiment shown in FIG. 1, the exterior radius of each centering spider is equal to the exterior radius of the containment pipe sections 16 and 18. The containment pipe sections will also be received in the open ends. The containment pipes will be bonded to the inside of each open end. Accordingly, the centering spider will be mechanically locked or wedged between the shoulder on one side and the end of the containment pipe section. The centering devices maintain the geometrical and dimensional relationship of the inner and outer containment members during assembly and installation.

One edge of each centering spider may optionally be chamfered to the shape of the shoulder formed by the first portion and the second portion.

Figure 2:
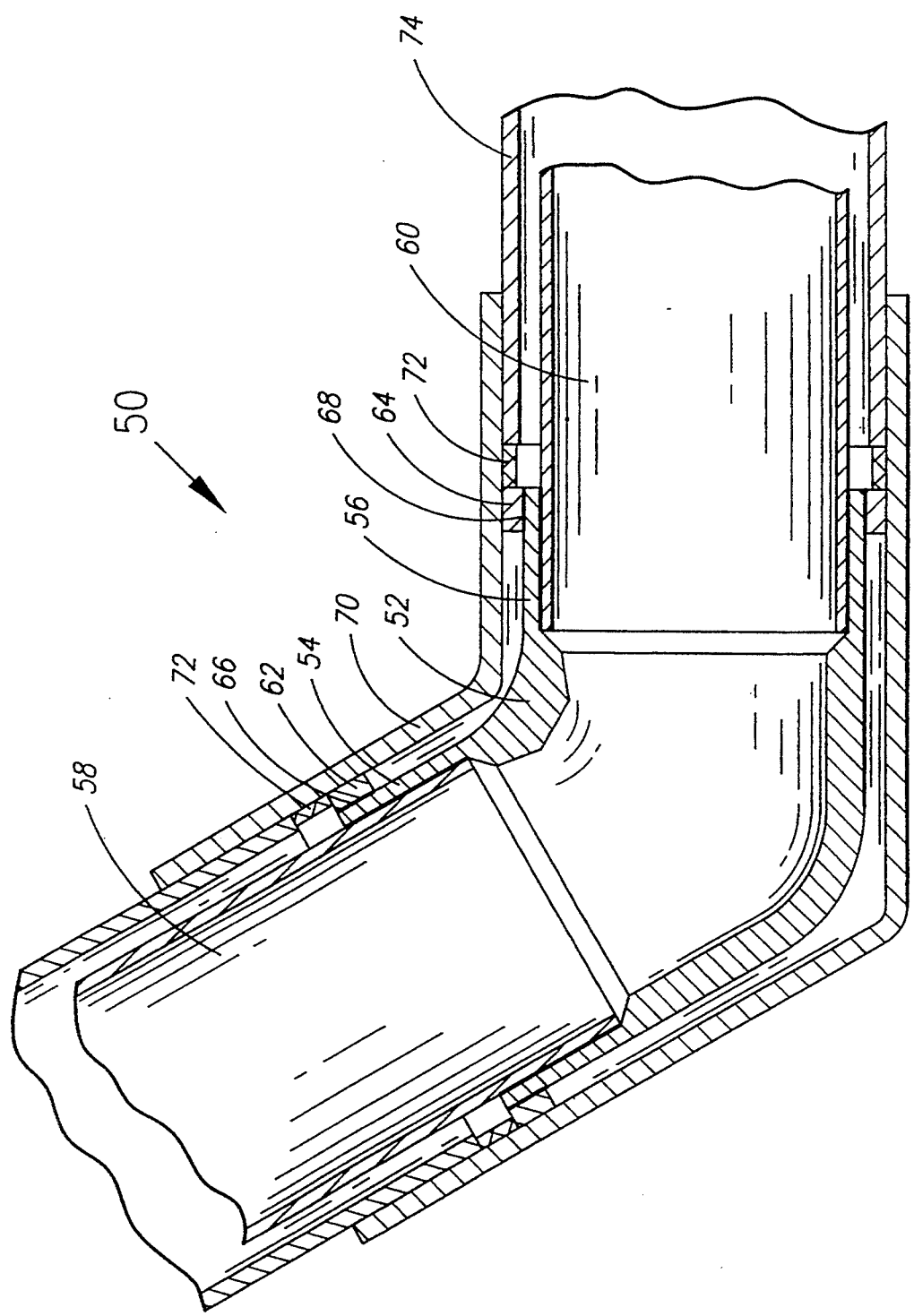
FIG. 2 illustrates an alternate embodiment of a double containment pipe fitting thereof.

FIG. 2 illustrates a sectional view of an alternate embodiment of the double containment fitting 50 of the present invention.

The embodiment shown in FIG. 2 illustrates a 45° angle fitting. Although other types of fittings such as T's, laterals, reducers and other standard components are well within the scope of the present invention.

The double containment fitting 50 includes an inner containment member 52 having a pair of opposed ends 54 and 56. Each open end 54 and 56 has an inner radius slightly larger than the exterior radius of the carrier pipe sections 58 and 60. Accordingly, the end of the carrier pipe sections are received in the open ends 54 and 56. The inner carrier pipe sections can be adhesively bonded to the open ends to form a liquid-tight seal.

A pair of centering spiders 62 and 64, in the nature of rings, are concentric with the inner containment member. Each spider has an inner area adhesively engaged with the exterior of the inner containment member near the open end of the inner containment member. Centering spider 62 is adhesively engaged at 66 with the open end 54 of the inner containment member. Centering spider 64 is adhesively engaged at 68 to the open end of the inner containment member. Each spider may also may have openings therethrough to allow passage of fluid in placement of detection cables and equipment.

An outer containment member 70 is coaxially and concentric with the inner containment member. The outer containment member has an interior radius slightly larger than the exterior radius of the containment pipe section 72 and 74.

Additionally, a semi-circular retaining ring may be bonded to the interior of each open end of the containment member. The retaining ring 72 and 74 provide a shoulder to align the centering spiders and accompanying inner containment member.

Figure 3:
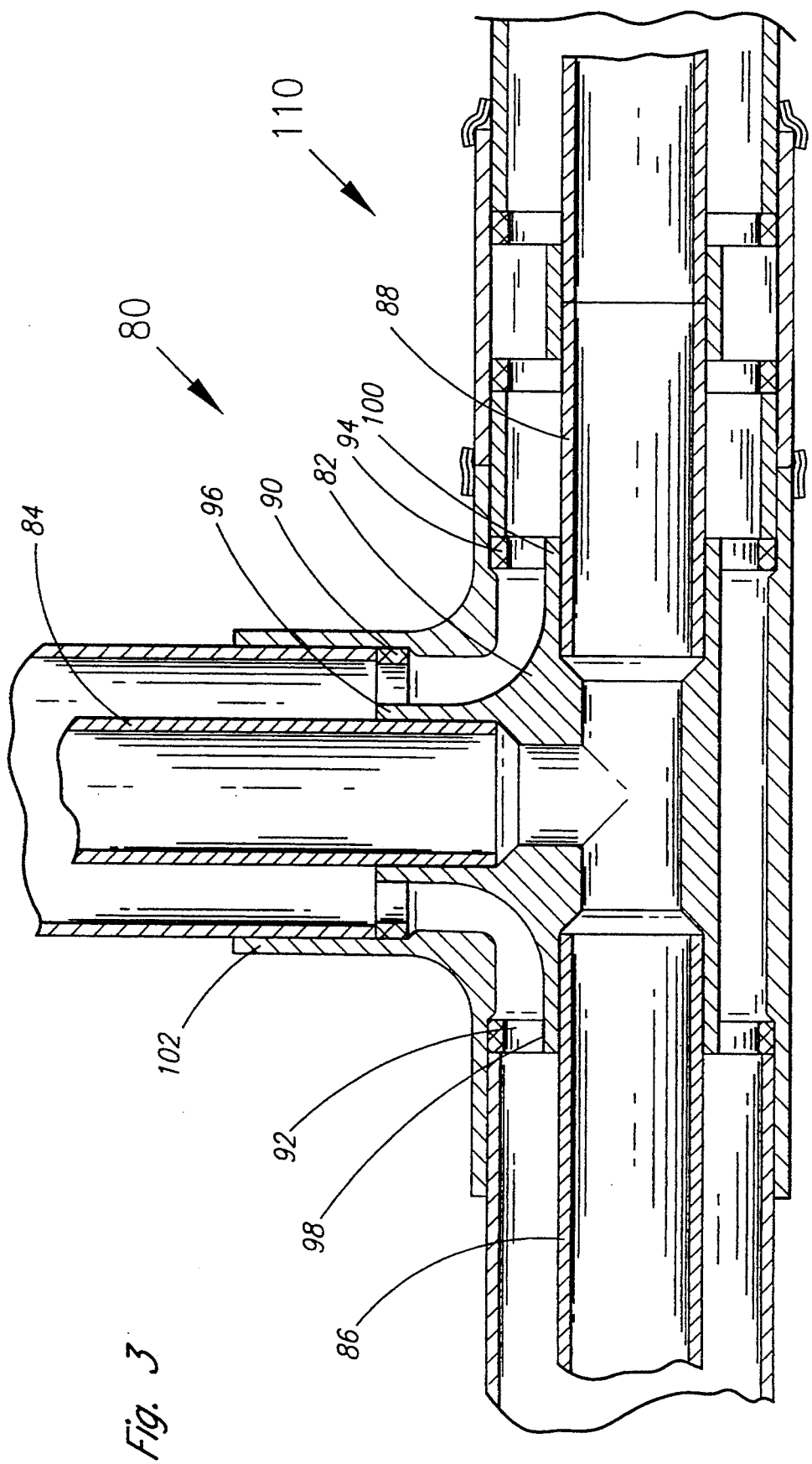
FIG. 3 illustrates a further alternate embodiment of a double containment pipe fitting thereof.

FIG. 3 illustrates a further alternate embodiment 80 illustrating a t-connection fitting. The double containment fitting 80 includes an inner containment member 82 having three open ends. Each open end has an inner radius slightly larger than the exterior radius of the carrier pipe sections 84, 86, and 88. The ends of the carrier pipe sections may be received in the open ends of the containment member and adhesively bonded to form a liquid-tight seal.

A centering spider is concentric with each open end of the inner containment member and is adhesively engaged with the exterior of the inner containment member near the open end.

Centering spider 90 is adhesively engaged at 96 with the open end of the inner containment member. Centering spider 92 is adhesively engaged at 98 with the open end of the inner containment member.

Finally, centering spider 94 is adhesively engaged at 100 with the open end of the inner containment member. Each spider may also have openings therethrough to allow passage of fluid in placement of detection cables and equipment.

An outer containment member 102 includes three open ends.

The embodiment 80, shown in FIG. 3, includes a further mechanism to restrain longitudinal movement of the pipe sections in the form of interlocking union 110. While various mechanisms may be used to describe such restraint mechanism, one such restraint mechanism is described in co-pending application Ser. No. 08/272,037 for an interlocking union for a double containment pipe.

In order to produce the present invention, the inner containment housing may first be formed. One way to manufacture the inner containment housing is to wrap material on a mold. Thereafter, the centering spiders may be bonded to the inner containment member.

Additionally, the outer containment member will be fabricated to half of its required thickness. Thereafter, the outer containment member will be cut or sliced through its diameter and the two outer containment member halves will be assembled around the outer containment member.

Finally, the outer containment member halves will be affixed together which will be done by overwrapping of the halves to complete the required thickness of the containment member. Since the outer containment member is independent of the inner containment member and centering spiders, a closer alignment of the inner and outer containment members are easily accomplished in the field.

Whereas, the present invention has been described in relation to the drawings attached hereto, it should be understood that other and further modifications, apart from those shown or suggested herein, may be made within the spirit and scope of this invention.

What is claimed is:

1. A double containment fitting for use with a double containment pipe having an inner carrier pipe and an outer containment pipe, otherwise restrained against excessive thermal expansion and contraction, which fitting comprises:

an inner carrier member having a pair of open ends;

a pair of centering spiders, each said spider adhesively engaged with the exterior of said inner carrier member near an end of said inner carrier member; and an outer containment member having a pair of open ends, each said open end including a first portion having an inner radius larger than the exterior radius of said centering spider and a second portion adjacent said first portion having an inner radius less than the exterior radius of said centering spider, providing a shoulder for abutting an edge of said centering spider.

2. A double containment fitting as set forth in claim 1 wherein each said open end of said inner carrier member has an inner radius larger than said inner carrier pipe to receive said carrier pipe therein.

3. A double containment fitting as set forth in claim 1 wherein said open end of each said outer containment member has an inner radius larger than said containment pipe so that said containment pipe will be received in said open end.

4. A double containment fitting as set forth in claim 1 wherein said edge of each said centering spider is chamfered to mate said shoulder.

5. A double containment fitting for use with a double containment pipe having an inner carrier pipe and an outer containment pipe, otherwise restrained against excessive thermal expansion and contraction, which fitting comprises:

an inner carrier member having a pair of open ends;

a pair of centering spiders, each said spider adhesively engaged with the exterior of said inner carrier member near an end of said inner carrier member; and an outer containment member having a pair of open ends, each open end having an inner radius larger than the exterior radius of said centering spider;

a ring segment affixed in each open end of said outer containment member providing a shoulder for abutting an edge of said centering spider.

6. A double containment fitting as set forth in claim 1 wherein each said open end of said inner carrier member has an inner radius larger than said inner carrier pipe to receive said carrier pipe therein.

7. A double containment fitting as set forth in claim 1 wherein said exterior radius of each said centering spider is equal to said exterior radius of said containment pipe.

* * * * *